United States Patent [19]

Griffin

[11] Patent Number: 4,820,030

[45] Date of Patent: Apr. 11, 1989

[54] LENS ARRANGEMENT

[75] Inventor: James L. Griffin, Carpentersville, Ill.

[73] Assignee: Wells-Gardner Electronics Corporation, Chicago, Ill.

[21] Appl. No.: 759,807

[22] Filed: Jul. 29, 1985

[51] Int. Cl.$^4$ .............................................. G02B 13/18
[52] U.S. Cl. .................................. 350/434; 250/222.2
[58] Field of Search ....................... 350/433, 434, 441; 250/222.2

[56] References Cited

U.S. PATENT DOCUMENTS

| | | | |
|---|---|---|---|
| 3,581,099 | 5/1971 | Franke et al. | 350/434 |
| 4,347,438 | 8/1982 | Spielman | 250/222.2 |
| 4,496,209 | 1/1985 | Itoh et al. | 350/433 |

Primary Examiner—John K. Corbin
Assistant Examiner—Rebecca D. Gass
Attorney, Agent, or Firm—McDermott, Will & Emery

[57] ABSTRACT

A lens arrangement for redirecting beams of light which diverge in a generally conical pattern from a fixed light source comprises a lens member configured and located relative to the light source for passing the diverging beams of light from the fixed light source therethrough substantially without changing the direction of the beams in a first plane, and for redirecting others of the diverging beams of light from the light source into substantially parallel beams of light as they pass through the lens member in substantially any one cross-sectional plane through the lens member which is substantially perpendicular with the first plane.

9 Claims, 1 Drawing Sheet

U.S. Patent
Apr. 11, 1989
4,820,030
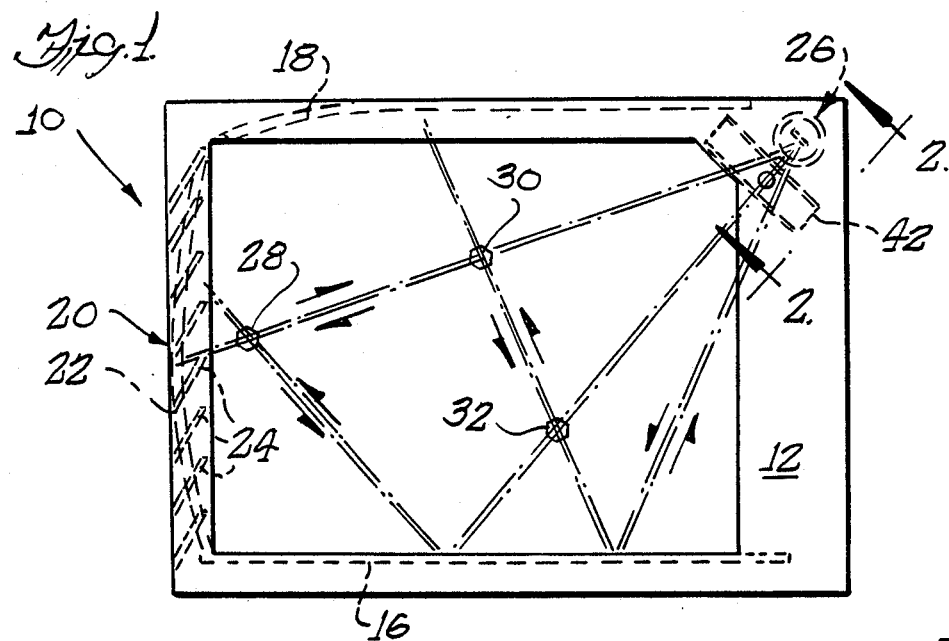
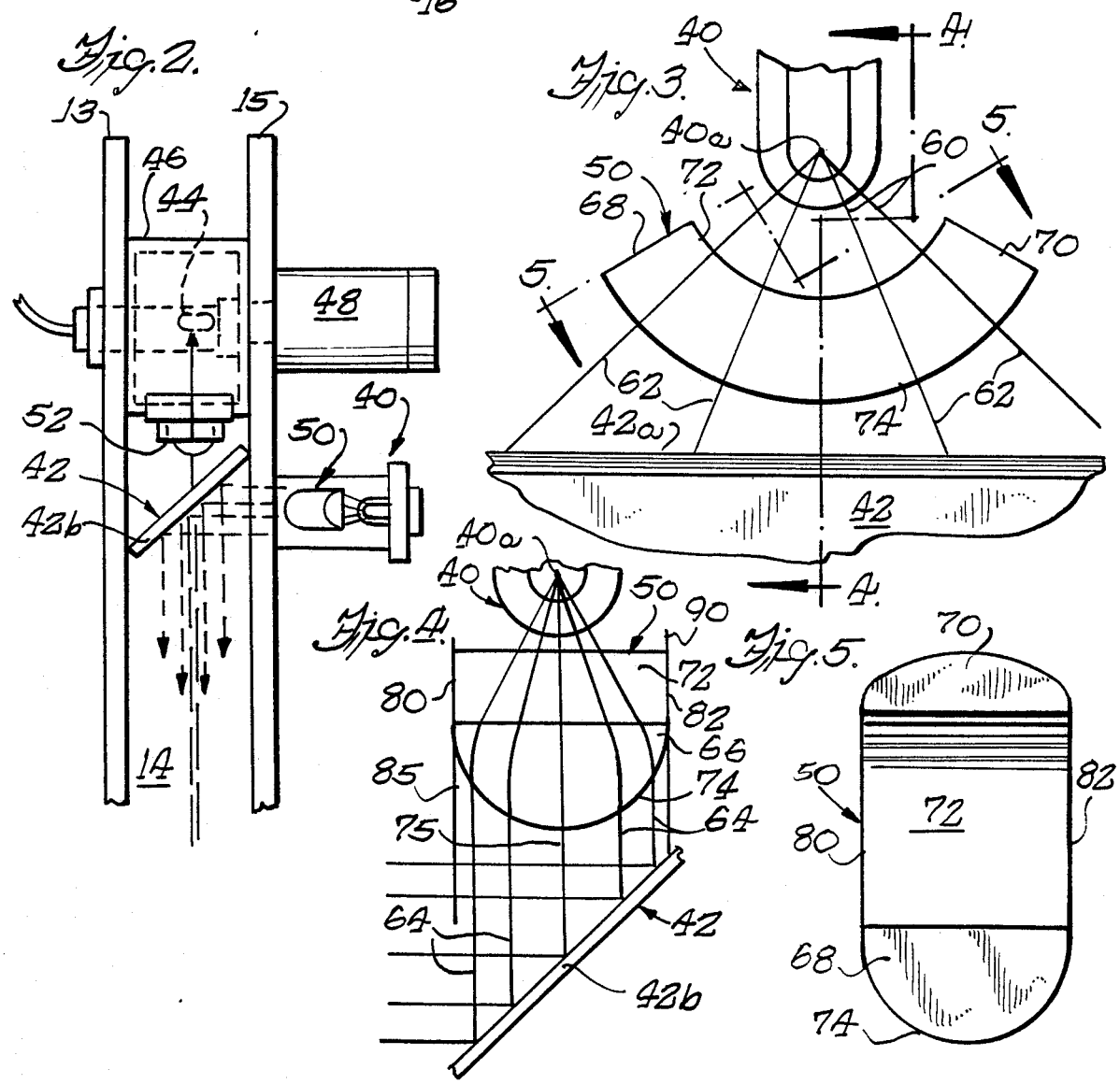

LENS ARRANGEMENT

BACKGROUND OF THE INVENTION

The invention is directed generally to a lens arrangement, and more particularly, to a lens arrangement for use with a light distribution and detection apparatus, which apparatus is preferably utilized in connection with a device for determining a location of an object within a given target zone.

While the lens arrangement of the invention is useful in a variety of applications, the disclosure will be facilitated by specific reference to use thereof for distributing light in a device for determining the location of an object within a target zone. One such device is disclosed as an "optical touch screen input device" in U.S. application Ser. No. 492,859, filed May 9, 1983, now U.S. Pat. No. 4,553,842 which application is assigned to the assignee of the present application.

As more fully described in the above-referenced application, such touch screen input devices are generally utilized with cathode ray tubes or other type of visual display screens or elements which are utilized with many computers and computer terminals for example. Such touch screen input devices include screen overlays superimposed upon the display screen, which may be of a capacitive or resistive type or alternatively may be ultrasonic or consist of a conductive grid. However, as described in the above-referenced application, such an overlay may also comprise an optical apparatus which generally creates a "light curtain" in front of the display screen, preferably in the non-visual infrared range so as not to interfere visually with reading of the screen by the operator. Penetration of this light curtain by an object, such as the finger of an operator, a pencil, or the like is readily detectable by the touch screen input apparatus and is interpreted to fix the location of penetration of the object relative to the touch screen and hence relative to the display screen.

In the optical touch screen input apparatus described in the above-referenced patent application, a generally rectilinear frame defines a generally rectangular target zone. A light distribution and detection apparatus mounted at one corner of the frame directs light into this target zone. Reflective assemblies extend along three sides of the target zone and are arranged to reflect light incident thereupon back to the light distribution and detection apparatus for detection thereby. A detector portion of the apparatus or device is associated with a scanning assembly which scans the target zone for receiving the return beams of light therefrom. Hence, a determination of the angular position of the scanning assembly at any given point in time also determines the angular orientation of the path of return light incident at that same time upon the detector.

The presence of an object in the target zone will result in a marked decrease in the amount of light reflected at angular orientations corresponding to the position of the object. The reflective assemblies are positioned so as to cause light to be received at the detector from at least two angular orientations with respect to any given point on the screen during the screening thereof. Hence, any object within the target zone will cause a marked decrease in received light at the detector for each of at least two angular orientations covered by the scanning process. Upon determining the two angles at which this decreased return light energy is detected, the position of the object relative to the two dimensions of the display screen may readily be determined.

While the foregoing apparatus and system has found widespread acceptance, there is room for yet further improvement. For example, in optical systems of this type there is always the problem of light losses which losses detract from the net amount of light reaching the detector. To maximize the sensitivity and resolution of the optical touch screen device, it is generally desirable to maximize the net amount of light energy available in the device. This also enhances the contrast between reflected light reaching the detector directly and light blocked by the object which is to be detected. These losses become particularly problematic as the size of the target zone increases.

In this latter regard, for relatively large display screens or devices, correspondingly large optical touch screen input devices are required. However, the problem of adequate illumination of a target zone becomes more acute as the size of the target zone correspondingly increases. While it is possible to utilize correspondingly higher intensity light sources, such light sources are also significant sources of heat energy, and this heat energy must be dissipated in the device. Any build-up of heat energy can cause significant other problems with the detection apparatus and other portions of the optical touch screen device. While specialized elements and components for operation at higher ambient temperatures may be utilized, this adds a significant expense to the apparatus. Alternatively, heat dissipation apparatus such as fans, heat sinks, cooling fins or the like may be added, but this also adds considerable expense to the apparatus. However, in many light distribution and detection devices heretofore associated with optical position locating or touch screen devices, little if any effort has been made to direct or focus the maximum amount of available light energy from the light source to the target zone. Accordingly, it is a general object of this invention to provide novel apparatus for increasing the proportion of light from the light source reaching the target zone, which will be appreciated to be particularly advantageous in connection with position locating devices utilizing relatively large target zones.

OBJECTS AND SUMMARY OF THE INVENTION

It is a general object of the invention to provide a novel and improved apparatus for increasing the intensity of illumination of the target zone of an optical position locating device.

A more specific object is to provide apparatus for increasing the proportionate amount of light reaching the target zone from a given light source.

A related object is to provide apparatus for use with a relatively large optical touch screen input device for increasing light intensity in the locating zone of the touch screen device while avoiding the use of high intensity light sources.

A related object is to provide apparatus in accordance with the foregoing objects which is relatively simple and inexpensive in its design and manufacture and yet highly reliable in operation.

Briefly, and in accordance with the foregoing objects, the present invention provides a lens arrangement for redirecting beams of light which diverge in a generally conical pattern from a fixed light source, the apparatus comprising a lens member configured and located relative to said light source for passing said diverging beams of light from said fixed light source therethrough substantially without changing the direction of said beams in a first plane, and for redirecting others of said diverging beams of light from said light source into substantially parallel beams of light as they pass through said lens member in substantially any one cross-sectional plane through said lens member which is substantially perpendicular with said first plane.

BRIEF DESCRIPTION OF THE DRAWINGS

The features of the present invention which are believed to novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

FIG. 1 is plan view, somewhat diagrammatic in form, of an optical position locating device in connection with which the present invention may advantageously be utilized;

FIG. 2 is an enlarged partial view of a portion of light distribution and detection apparatus associated with the position locating device of FIG. 1, including apparatus in accordance with the present invention;

FIG. 3 is an enlarged partial plan view of a portion of the apparatus of FIG. 2, illustrating a lens member in accordance with the present invention;

FIG. 4 is a developmental view taken generally along the line 4—4 of FIG. 3; and FIG. 5 is a developmental view of the lens member of FIG. 3, taken generally along the line 5—5 thereof.

DETAILED DESCRIPTION OF THE ILLUSTRATED EMBODIMENT

Referring now to the drawings and initially to FIG. 1, the lens arrangement of the invention is particularly useful in conjunction with an optical touch screen input device, here designated generally by reference numeral 10. Such a device is more fully described in the above-referenced U.S. application, Ser. No. 492,859 to which further reference is invited. Briefly, the apparatus 10 includes a generally rectangular housing or frame 12 which defines therewithin a generally rectangular target zone 14. Disposed within housing 12 about the target zone 14 are a plurality of reflectors 16, 18 and 20. Preferably, the reflector 16 is a flat reflector such as a mirror. However, reflector 18 preferably comprises a retroreflector and reflector 20 comprises a retroreflector assembly. As is known in the art, a retroreflector is a reflector configured for redirecting a beam of light back upon its path of incidence. The retroreflector assembly 20 comprises a retroreflector strip 22 and a plurality of retroreflector elements 24. A light distribution and detector assembly 26 is placed in one corner of the housing or frame 12, and is configured for directing light into the target zone 14 and receiving light reflected back therefrom. In this regard, retroreflector assembly 20 is arranged such that the retroreflector strip 22 will redirect beams of light received directly from the distribution and detection assembly 26, while retroreflector elements 24 redirect light received by way of the mirror 16.

As more fully explained in the above-referenced co-pending application, the foregoing arrangement permits detection of light reflected from the target zone in such a way as to fix the location of objects located within the target zone 14, for example objects 28, 30 and 32. Briefly stated, the arrangement of the reflectors or reflective assemblies 16, 18 and 20 is such that at least two beams of light traveling along different paths will intersect each of the objects 28, 30 and 32. Accordingly, a detector portion of the assembly 26 will detect a marked decrease in the level of reflected light received along each of these two paths intersecting a given one of the objects 28, 30 and 32. By determining the angle of each of these paths relative to some fixed reference, then, the location of the object within the plane of the target zone 14 may be determined.

Referring now to FIG. 2, an exemplary form of the light distribution and detection assembly 26 is illustrated. In this regard, it will be noted that the housing or frame 12 includes similar front and rear frame members 13, 15, intermediate which the target zone 14, as well as portions of the apparatus 26, are located. In the embodiment illustrated, the light distribution and detecting assembly comprises a light source 40 which preferably takes the form of an incandescent lamp. However, other light sources may be used without departing from the invention. This light source 40 is positioned for directing light generally to a light redirecting means 42 which preferably comprises a beam splitter, for redirecting light into the target zone 14.

In accordance with the invention a novel focusing or lens arrangement 50 which will be described in greater detail hereinafter is advantageously interposed intermediate the light source 40 and retroreflector or redirecting means 42. The detection portion of the assembly 26 comprises a light sensitive detector device 44 which is here illustrated mounted within a rotatable housing 46 forming a portion of a scanning assembly. This scanning assembly also includes a motor 48 which is mounted for rotating the housing 46 and detector 44 mounted therein between the frame members 13 and 15 relative to the target zone 14. This rotation causes beams of light to be detected over the target zone at varying angles as generally indicated in FIG. 1. A lens structure 52 is provided for receiving beams of light reflected from the target zone 14 and directing these beams of light back to the detector 44.

Other specific arrangements of the light distribution and detection assembly 26 may be utilized without departing from the invention.

In accordance with the invention and referring now to FIGS. 3 through 5, the novel lens arrangement 50 is configured for directing a maximum amount of light from the light source or lamp 40 to the beam splitter or other means for directing light into the target zone 14. That is, regardless of the particular arrangement of light distribution and detection assembly 26 utilized, the lens arrangement 50 in accordance with the invention is configured for assuring that a maximum amount of light from a light source arrive in the target zone. It will be appreciated that the target zone 14 is relatively narrow in one plane, that is intermediate the frame members 13 and 15, and relatively broad in another plane, that is in the plane thereof illustrated in FIG. 1. Moreover, it will be appreciated that the light from the light source or lamp 40 generally takes the form of diverging beams of light as indicated generally by reference numeral 60.

Hence it is difficult to maximize the amount of light which reaches the target zone.

Accordingly, the lens arrangement 50 of the invention comprises a single lens member and preferably a solid lens body for redirecting the beams of light 60 which diverge in a generally conical pattern from the fixed light source or lamp 40. This lens member or solid lens body is configured and located relative to the light source 40 for passing the diverging beams of light 60 therethrough substantially without changing the directions of the beams in a first plane therethrough as indicated by emerging beams 62. In the illustrated embodiment this first plane extends across the relatively wider dimension or surface 42a of redirecting means or beam splitter 42. This surface 42a in turn lies across and reflects light into the relatively wider plane of interest of the target zone 14, which plane is illustrated in FIG. 1. In contrast the relatively narrower side or dimension 42a of redirecting means or beam splitter 42 directs the beam of light into the relatively narrower dimension of target zone 14, between frame members 13 and 15. This first plane is one which bisects the lens longitudinally, as indicated by line 75 in FIG. 4.

In accordance with the invention, the lens member or solid lens body 50 is further configured for redirecting others of the diverging beams of light 60 from the light source 42 into substantially parallel beams of light as indicated at 64 in FIG. 4, as these beams pass through and emerge from the lens member 50 in any cross-sectional plane therethrough which is substantially perpendicular with the first plane. In this regard, the cross-sectional plane through lens 50 illustrated in FIG. 4 will be seen to be one such cross-sectional plane.

The foregoing will be more readily understood upon consideration of the geometry or configuration of the lens member or solid lens body 50. Referring to FIGS. 3 through 5, the lens member 50 is shaped so as to define a segment of the radially outer one-half of a torus. In cross-section, the radially outer one-half of a torus appears as a semi-circle, for example as indicated generally by reference numeral 66 in FIG. 4. In this regard, the end-most faces or surfaces of lens 50 are also generally flat, semi-circular surfaces, as indicated for example by reference numeral 68 in FIG. 5. It will be noted that the beam splitter 42 is shown in FIGS. 3 and 4 somewhat closer to the lens 50 than in FIG. 2 to facilitate the description. Also, the direction of the view in FIG. 4 is opposite than that in FIG. 2.

More particularly, as best viewed in FIG. 5, the segment of the radially outer one-half of a torus defined by the lens member is a segment which subtends substantially 120 degrees of arc, that is, one-third of a torus. That is, an arc measured between end face 68 and opposite end face 70 of the lens as viewed in FIG. 5 would measure substantially 120 degrees. Accordingly, the lens member has a substantially concave inner surface 72 which is of cylindrical curvature and a convex outer surface 74 which is of toroidal curvature. As best viewed in FIGS. 3 and 4, the lens member is positioned relative to the light source 40 such that the inner surface 72 is in relatively close proximity to the light source for receiving the diverging beams of light 60 therefrom.

More particularly, if a filament of the lamp can be modeled as a point source 40a, this point 40a is preferably located substantially at the center of the torus defined by the lens 50. Accordingly, the first plane 75 through the lens member, as mentioned above, through which beams of light from the light source pass without changing their direction is a plane substantially bisecting the lens along the diameter of the torus.

Accordingly, all beams of light lying entirely within this plane 75 pass through the lens unchanged in direction. On the other hand, all beams of light striking the inner surface of lens 72 at angles of incidence other than along the right angle defined by beams in the plane 75 have their angles of incidence preserved as they pass through the lens only in a plane projected onto the plane 75. These beams are otherwise redirected, as illustrated in FIG. 4, into a second plane which is orthogonal with the plane 75 and forms a cross-section through the lens in a plane perpendicular with the plane 75 as shown in FIG. 4. Hence, the beams 60 in the plane of FIG. 4 are redirected into beams 64 al of which are parallel with each other and lie in a plane which is orthogonal with the plane 75 which also forms a cross-section through the lens 50.

Alternatively viewed the inner and outer surfaces 72 and 74 of the lens 50 join along opposite curved edges 80 and 82 of the inner surface 72. Each of these edges 80 and 82 will thus define a segment of a circumference of the cylindrical surface defined by the inner surface 72. More importantly, these two curved edges or lines 80 and 82 each define one of a pair of parallel and spaced apart planes, indicated in FIG. 4 by lines 85 and 80. The lens member 50 is therefore configured and oriented relative to light source 40 such that all of the beams of light impinging upon the inner surface 72 emerge from the outer surface 74 in parallel with and intermediate these parallel planes 80 and 82. However, the directions of these beams in the plane 75 is presented as indicated by reference numeral 62 in FIG. 3.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A lens member in combination with a device for determining a location of an object in a target zone that is relatively broad in a first plane and relatively narrow in a second plane, which comprises:

a location determining device including a fixed light source and a light detection apparatus, said light source and said light detection apparatus being located outside the target zone, and reflector assemblies extending around a portion of the periphery of the target zone for reflecting light from the light source back toward the light detection apparatus, and a lens member for redirecting beams of light which diverge in a generally conical pattern from the fixed light source, said lens member configured and located between said light source and said target zone for passing said diverging beams of light from said light source therethrough substantially without changing the direction of said beams in a first plane, and for redirecting said diverging beams of light from said light source into substantially parallel beams of light as they pass through said lens member in any cross-sectional plane through said lens member which is substantially perpendicular with said first plane, said light distribution means distributing the beams redirected in said first plane generally into the broad first plane of the target zone, thereby intensifying the light distributed in the relatively broad first plane of the target zone and reflected back toward the light detection apparatus by the reflector assemblies.

2. A lens member and location determining device according to claim 1 wherein said lens member is shaped so as to define a segment of the radially outer one-half of a torus.

3. A lens member and location determining device according to claim 2 wherein said one plane comprises a plane bisecting said lens along a diameter of said torus.

4. A lens member and location determining device according to claim 2 wherein said segment defined by said lens member comprises a segment which subtends substantially 120 degrees of arc of said radially outer one-half of said torus.

5. A lens member and location determining device according to claim 3 wherein said lens member has a substantially concave inner surface of cylindrical curvature at one side thereof and a convex surface of a toroidal curvature at the other side thereof.

6. A lens member and location determining device according to claim 4 wherein said lens member is positioned such that said inner surface thereof is in close proximity to said light source and is substantially centered with respect to said light source.

7. A lens member and location determining device according to claim 4 wherein said lens member is positioned relative to said light source such that beams of light striking said inner surface substantially perpendicular therewith pass through said lens member unchanged in direction by said lens member, and such that beams of light which strike said inner surface at other angles of incidence are maintained at their angle of incidence as projected onto said one plane and are otherwise redirected into parallel beams in a second plane which is orthogonal with said one plane and forms a cross-section through said lens member.

8. A lens member and location determining device according to claim 6 wherein said one plane comprises a plane bisecting said lens along a diameter of said torus.

9. A lens member and location determining device according to claim 4 wherein said inner and outer surfaces join along opposite curved edges of said inner surface, each of which edges comprises one of a pair of spaced apart segments of a circumference of said cylindrical curvature defined by said inner surface, and each of said curved edges defining a plane, which planes are parallel and spaced apart, said lens member being configured and oriented relative to said light source, such that all of the beams of light impinging upon said inner surface emerge from said outer surface in parallel with and intermediate the parallel planes so defined.

* * * * *